(12) United States Patent
Scapaccino

(10) Patent No.: US 8,376,132 B2
(45) Date of Patent: Feb. 19, 2013

(54) PROCESS AND APPARATUS FOR STOCKING SEMIFINISHED PRODUCTS FOR MANUFACTURING TYRES

(75) Inventor: Giuliano Domenico Scapaccino, Turin (IT)

(73) Assignee: Pirelli Tyre S.p.A., Milan (IT)

(*) Notice: Subject to any disclaimer, the term of this patent is extended or adjusted under 35 U.S.C. 154(b) by 303 days.

(21) Appl. No.: 12/452,489

(22) PCT Filed: Jul. 9, 2007

(86) PCT No.: PCT/IB2007/052691
§ 371 (c)(1),
(2), (4) Date: Jan. 5, 2010

(87) PCT Pub. No.: WO2009/007789
PCT Pub. Date: Jan. 15, 2009

(65) Prior Publication Data
US 2010/0126824 A1    May 27, 2010

(51) Int. Cl.
*B65G 47/74* (2006.01)
(52) U.S. Cl. ............. 198/861.3; 198/370.04; 198/477.1; 198/802
(58) Field of Classification Search .................. None
See application file for complete search history.

(56) References Cited

U.S. PATENT DOCUMENTS 3,154,201 A   10/1964  Busch
3,831,733 A *  8/1974  Howard et al. ............... 198/447
3,866,774 A    2/1975  Ims
4,029,222 A    6/1977  Yano et al.
5,181,597 A *  1/1993  Geerts ...................... 198/370.04
5,839,566 A * 11/1998  Bonnet ...................... 198/370.04
6,484,869 B1* 11/2002  Brouwer et al. ............... 198/592

FOREIGN PATENT DOCUMENTS

DE   10 51 737     2/1959
JP   58-216831    12/1983
JP   2-8122        2/1990

OTHER PUBLICATIONS

European Search Report for International Application No. PCT/IB2007/052691, mailing date Mar. 28, 2008.

* cited by examiner

*Primary Examiner* — Kavel Singh
(74) *Attorney, Agent, or Firm* — Finnegan, Henderson, Farabow, Garrett & Dunner, L.L.P.

(57) ABSTRACT

A process and an apparatus for stocking semifinished products for manufacturing tires for vehicle wheels, wherein a semifinished product is supplied on a roller conveyor along a supplying direction. Between the rollers of the conveyor at an unloading station, there are arranged arms of a lift. When the semifinished product reaches the unloading station, the arms are rotated around an axis parallel to the supplying direction in such a way as to lift the arms and slide the semifinished product by gravity on the arms along an unloading direction that is perpendicular to the supplying direction and to first ends of these arms. The semifinished product drops through gravity from the first ends onto a resting plane of a supporting bench positioned below the first ends and spaced apart therefrom.

29 Claims, 11 Drawing Sheets

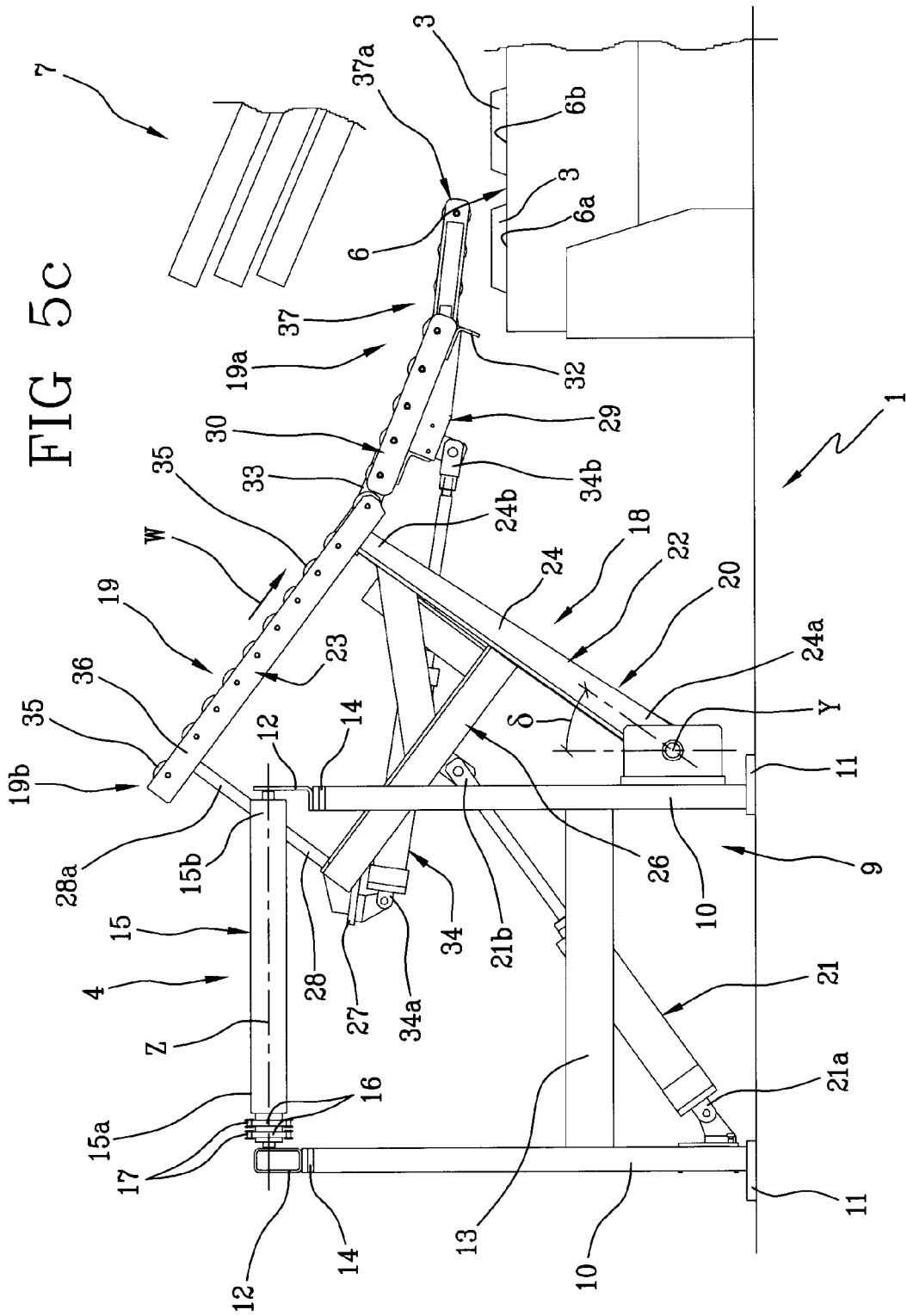

PROCESS AND APPARATUS FOR STOCKING SEMIFINISHED PRODUCTS FOR MANUFACTURING TYRES

CROSS REFERENCE TO RELATED APPLICATION

This application is a national phase application based on PCT/IB2007/052691, filed Jul. 9, 2007, the content of which is incorporated herein by reference.

BACKGROUND OF THE INVENTION

1. Field of the Invention

The present invention relates to a process and an apparatus for stocking semifinished products for manufacturing tyres for vehicle wheels.

Preferably, the object of the invention is an apparatus and a process for stocking semifinished products consisting of drawn or extruded profiles intended to form semifinished products, preferably tread bands of tyres for trucks.

2. Description of the Related Art

A tyre for vehicle wheels generally comprises a carcass structure including at least one carcass ply having respectively opposite end flaps in engagement with respective annular anchoring structures, integrated into the regions usually identified as "beads", which have an inner diameter substantially corresponding to a so-called "fitting diameter" of the tyre on a respective mounting rim.

Associated with the carcass structure is a belt structure comprising one or more belt layers, located in radial superposed relationship with each other and with the carcass ply and having textile or metallic reinforcing cords with a crossed orientation and/or substantially parallel to the circumferential extension direction of the tyre. A tread band is applied to the belt structure at a radially external position, which tread band too is made of elastomeric material like other semifinished products constituting the tyre.

The tread band is manufactured through drawing. The drawing gives rise to a semifinished product defined by a band or belt having a preset cross-section profile, which belt is devoid of the tread pattern and is cut to size on the basis of the dimensions of the tyre to be made.

To the side surfaces of the carcass structure, which each extend from one of the side edges of the tread band to the respective annular structure anchoring to the beads, respective sidewalls in elastomeric material are applied in an axially external position, which sidewalls can also be previously manufactured as drawn or extruded profiles.

After the drawn or extruded semifinished products have been manufactured, the semifinished products that are, for example, intended to form the tread band or the sidewalls of a tyre, are conveyed on a roller conveyor and loaded on suitable book trucks, where they remain stocked until they are deposited on the carcass.

In order to move the semifinished products from the conveyor to the book truck, using two operators to grasp each semifinished product by the ends, lift each semifinished product manually and deposit each semifinished product on the book truck is known.

Subsequently to building of the green tyre carried out through assembly of the respective semifinished products, moulding and vulcanisation treatment is generally carried out that aims to cause structural stabilisation of the tyre through cross-linking of the elastomeric compositions and also to imprint a desired tread pattern on the tread band wound around the carcass before vulcanisation and to imprint possible distinctive graphic marks at the sidewalls.

Automatic devices for loading materials onto benches are further known.

For example, document U.S. Pat. No. 4,029,222 discloses an apparatus for loading material in sheets onto a plurality of trays of a book truck. The apparatus comprises a loading mechanism located near the book truck, to load a preset number of sheets of material onto the trays of the book truck. A wait mechanism is arranged near an end of the loading mechanism far from the book truck, to transport the sheets on the loading mechanism when the loading mechanism is devoid of sheets and to retain the sheets when the loading mechanism is provided with sheets. An alignment mechanism is arranged near an end of the wait mechanism far from the loading mechanism to align the sheets and convey them to the wait mechanism.

Document U.S. Pat. No. 3,866,774 discloses a method and apparatus for automatically stocking tyre tread bands. The tread bands that advance in sequence along a first conveyor are supplied to a rotating removal drum where they are lifted onto a second conveyor. Rotating arms are arranged on the second conveyor, which arms project the band through the space onto the trays of a book truck. The book truck includes an indexing unit that indexes each of the trays in a horizontal position at which the indexing unit receives a band. Means is provided for progressively varying the trajectories of the launched bands in such a way as to ensure that the bands are deposited on the respective tray in undeformed condition.

Document JP2008122 discloses a chain conveyor that is movable around a fulcrum, consisting of a shaft, and able to be retracted between the rollers of a roller conveyor to convey a tread band. When the band has reached a preset position, the chain conveyor is lifted and the tread band is lifted therewith. A sliding table is brought near the shaft, the chain conveyor is driven and the band is conveyed on a loading conveyor placed on the table. The table is moved in such a way that an end of the loading conveyor moves to an end of a bench. The table is returned to the shaft whilst the loading conveyor is driven and the band is transferred automatically. The Applicant has addressed the problem of improving the manufacturing process for manufacturing tyres, in particular in relation to the management of semifinished products that are manufactured and stocked before being applied to the tyre.

SUMMARY OF THE INVENTION

The Applicant has also addressed the problem of improving the quality of the tyres and making the quality features of all the tyres manufactured homogenous, with particular reference to extruded or drawn semifinished products. In fact, during manual movement from the conveyor to the trays, the semifinished products are not always deposited in the same way and in the same positions.

The Applicant has also addressed the problem of reducing or eliminating physically demanding tasks that over the long term can cause physical problems for operators and make personnel management difficult. This problem is felt particularly in the field of the manufacture of tyres for trucks, where each tread band comes to weigh 30-40 kg.

Further, the Applicant has addressed the problem of increasing productivity in the manufacture of tyres.

The Applicant has further addressed the problem of simplifying the handling devices for handling prior-art sheet materials or profiled sections and making the handling devices less costly and more reliable.

The Applicant has found that by raising each semifinished product from the conveyor connected to the extruder by means of a plurality of arms of a comb lift interposed between the rollers of the conveyor, sliding the finished product by gravity along an inclined plane, defined by the same arms, and dropping the semifinished product onto a resting plane of a bench it is possible to load the bench in a simple and effective manner without compromising the quality of the semifinished products.

More specifically, according to a first aspect, the present invention relates to a process for stocking semifinished products for manufacturing tyres, comprising: supplying on a roller conveyor a semifinished product along a supplying direction that is parallel to the longitudinal extent of the semifinished product; arranging between the rollers of the conveyor, at an unloading station, arms of a lift; conveying the semifinished product as far as said unloading station; rotating the arms of the lift around an axis parallel to the supplying direction, in such a way as to raise the arms in relation to the conveyor and slide the semifinished product by gravity on said arms along an unloading direction that is perpendicular to the supplying direction and to first ends of said arms; positioning a resting plane of a supporting bench below the first ends of the arms and spaced apart from said first ends so that the semifinished product drops by gravity onto said resting plane.

The Applicant has found that by exploiting above all the force of gravity it is possible to move the semifinished products easily and without adopting complex driven conveyors.

The Applicant has found that sliding the semifinished products on an inclined plane and the drop thereof onto the supporting planes enables the semifinished products to be deposited on the benches with repeatability and precision. At the same time, the Applicant has observed that this operation does not compromise the integrity of the semifinished products and therefore improves the quality of the finished tyre.

According to a further aspect, the present invention relates to an apparatus for stocking semifinished products for manufacturing tyres, comprising: a roller conveyor extending along a supplying direction and operationally connectable to a drawing line for drawing a semifinished product, to supply the semifinished product on said roller conveyor, said roller conveyor comprising at least an unloading station; a lift located near the unloading station and comprising a plurality of arms; a bench positioned near the lift and comprising at least a resting plane; the lift being movable between a loading position, in which the arms lie at least partially interposed between the rollers of the roller conveyor, and an unloading position, in which the arms are rotated with respect to the loading position around an axis parallel to the supplying direction and at least partially raised with respect to the rollers of the roller conveyor; said arms in the unloading position having first ends placed above said at least a resting plane; said arms in the unloading position defining a chute for sliding by gravity the semifinished product along an unloading direction that is perpendicular to the supplying direction and to the first ends of said arms in such a way as to drop the semifinished product by gravity onto the resting plane.

The present invention, in at least one of the aforesaid aspects, may have one or more of the preferred features that are disclosed below.

Preferably, during sliding along the unloading direction the semifinished product assumes tilt angles with respect to a horizontal plane that grow progressively smaller, in such a way as to slow at the first ends.

In this way, the profiles impact softly on the supporting plane with a reduced risk of being spoilt. Further, preferably, a first semifinished product is dropped by gravity onto a first zone of the resting plane and a second semifinished product, subsequent to the first, is dropped onto a second zone of the resting plane adjacent to the first zone.

The process thus enables each of the supporting planes to be loaded with two or more semifinished products, in such a way as to save space.

According to an embodiment, the semifinished product slides on idling rollers mounted on each arm.

Preferably, when the semifinished product passes onto the first ends of the arms, said semifinished product forms with the resting plane a tilt angle that is less than or the same as approximately 20°.

Further, preferably when, the semifinished product passes onto the first ends of the arms, said semifinished product forms with the resting plane a tilt angle that is greater than or the same as approximately 5°.

Still more preferably, when the semifinished product passes onto the first ends of the arms, said semifinished product forms with the resting plane a tilt angle that is less than or the same as approximately 15°.

Further, when the semifinished product passes onto the first ends of the arms, said semifinished product forms with the resting plane a tilt angle that is greater than or the same as approximately 10°.

The tilt angle can be set on the basis of the dimensions of the semifinished product and the weight thereof in such a way that it impacts on the resting plane substantially without being spoilt and in the correct position.

According to an embodiment the arms of the lift are lifted partially whilst the semifinished product reaches the unloading station, in such a way as to slow the stroke of said semifinished product along the supplying direction.

In this way, having to check the driven rollers of the conveyor to stop the semifinished product at the unloading station is avoided.

Preferably, a surface of the semifinished product rests on the roller conveyor and the surface of said semifinished product is deposited on the resting plane. According to an embodiment of the apparatus, each of the arms comprises a plurality of idling rollers mounted on said arm around a rotation axis that is perpendicular to the unloading direction, in such a way as to enable sliding of the semifinished product on said idling rollers.

The idling rollers are cheap, do not substantially need maintenance and ensure optimal sliding by gravity of the semifinished product.

According to an embodiment, each of the arms comprises a first portion that is interposable between the rollers of the roller conveyor and a second portion that is angled with respect to said first portion and has the respective first end; said second portion, in the loading position, being tilted upwards and protruding in an overhanging manner from the roller conveyor.

Preferably, the first portion and the second portion delimit an angle that is less than or the same as approximately 170°.

Further, the first portion and the second portion delimit an angle that is greater than or the same as approximately 130°.

More preferably, the first portion and the second portion delimit an angle that is less than or the same as approximately 160°.

Further, the first portion and the second portion delimit an angle that is greater than or the same as approximately 140°.

The double tilt of the arms enables the semifinished product to be slowed that slides on the lift just before it drops onto the resting plane, in such a way as to prevent the impact with the latter from being too violent.

Preferably, the second portions are foldable in a position that is transverse to the first portions, to facilitate access to the conveyor.

According to an embodiment, the lift further comprises extensions that are movable between a retracted position and an extracted position, to drop by gravity successive semifinished products onto different and adjacent zones of the same resting plane.

In particular, the lift further comprises auxiliary extension arms that are mounted at the first ends and are movable between a retracted position and an extracted position, in which they extend beyond the first ends, to drop successive semifinished products by gravity onto different and adjacent zones of the same resting plane.

Further, according to an embodiment, each of the extensions comprises a plurality of idling rollers mounted around a rotation axis that is perpendicular to the unloading direction.

Preferably, the auxiliary extension arms delimit, in the extracted position, with the second portions, an angle that is less than or the same as approximately 170°.

Further, the auxiliary extension arms delimit, in the extracted position, with the second portions, an angle that is greater than or the same as approximately 130°. More preferably, the auxiliary extension arms delimit, in the extracted position, with the second portions, an angle that is less than or the same as approximately 160°.

Further, the auxiliary extension arms delimit, in the extracted position, with the second portions, an angle that is greater than or the same as approximately 140°. Also the tilt of the auxiliary arms enables the semifinished product to be slowed that slides on the lift just before it drops onto the resting plane, in such a way as to prevent the impact with the latter from being too violent.

According to an embodiment of the apparatus the lift comprises a supporting frame of the arms hinged around the axis parallel to the supplying direction.

Using single arms mounted on the supporting frame enables the reliability of the apparatus to be increased, inasmuch as it is possible to replace the arms individually and the apparatus is able to operate even if one or two arms are damaged.

Further, the lift comprises at least an actuator connected to the supporting frame, to rotate said frame around the axis parallel to the supplying direction and move the lift between the loading position and the unloading position.

Preferably, the supporting frame comprises a first structure supporting the first portions of the arms and a second structure supporting the second portions of the arms.

More preferably, the second structure is hinged on the first structure and is movable with respect to said first structure between a work configuration, in which the second portions are tilted upwards and protrude in an overhanging manner from the roller conveyor, and a rest configuration, in which the second portions lie folded downwards in a position that is transverse to the first portions.

According to an embodiment, the second structure further supports auxiliary extension arms that are mounted at the first ends and are movable between a retracted position and ah extracted position, in which the auxiliary extension arms extend beyond the first ends to drop successive semifinished products by gravity onto different and adjacent zones of the same resting plane.

Preferably, in the unloading position, the second portions define a sliding plane that is tilted with respect to the resting plane by an angle that is less than or the same as approximately 20°.

Further, in the unloading position, the second portions define a sliding plane that is tilted with respect to the resting plane by an angle that is greater than or the same as approximately 5°.

More preferably, in the unloading position, the second portions define a sliding plane that is tilted with respect to the resting plane by an angle that is less than or the same as approximately 15°.

Further, in the unloading position, the second portions define a sliding plane that is tilted with respect to the resting plane by an angle that is greater than or the same as approximately 10°.

Preferably, in the unloading position, the extracted auxiliary arms define a sliding plane that is tilted with respect to the resting plane by an angle that is less than or the same as approximately 20°.

Further, in the unloading position, the extracted auxiliary arms define a sliding plane that is tilted with respect to the resting plane by an angle that is greater than or the same as approximately 5°.

More preferably, in the unloading position, the extracted auxiliary arms define a sliding plane that is tilted with respect to the resting plane by an angle that is less than or the same as approximately 15°.

Further, in the unloading position, the extracted auxiliary arms define a sliding plane that is tilted with respect to the resting plane by an angle that is greater than or the same as approximately 10°.

According to a preferred embodiment, the supporting bench is a book truck and comprises a plurality of trays, each of said trays having a resting plane.

Further features and advantages will become more apparent from the detailed description of a preferred but not exclusive embodiment of a process and of an apparatus for stocking semifinished products for manufacturing tyres for vehicle wheels, according to the present invention.

BRIEF DESCRIPTION OF THE DRAWINGS

This description is presented here with reference to the attached drawings, which are provided only by way of non-limiting example, in which:

FIGS. 5a, 5b, 5c show the raised side view of FIG. 2 with the apparatus in the second position, in the second operating configuration and in respective operating instants;

Figure 1:
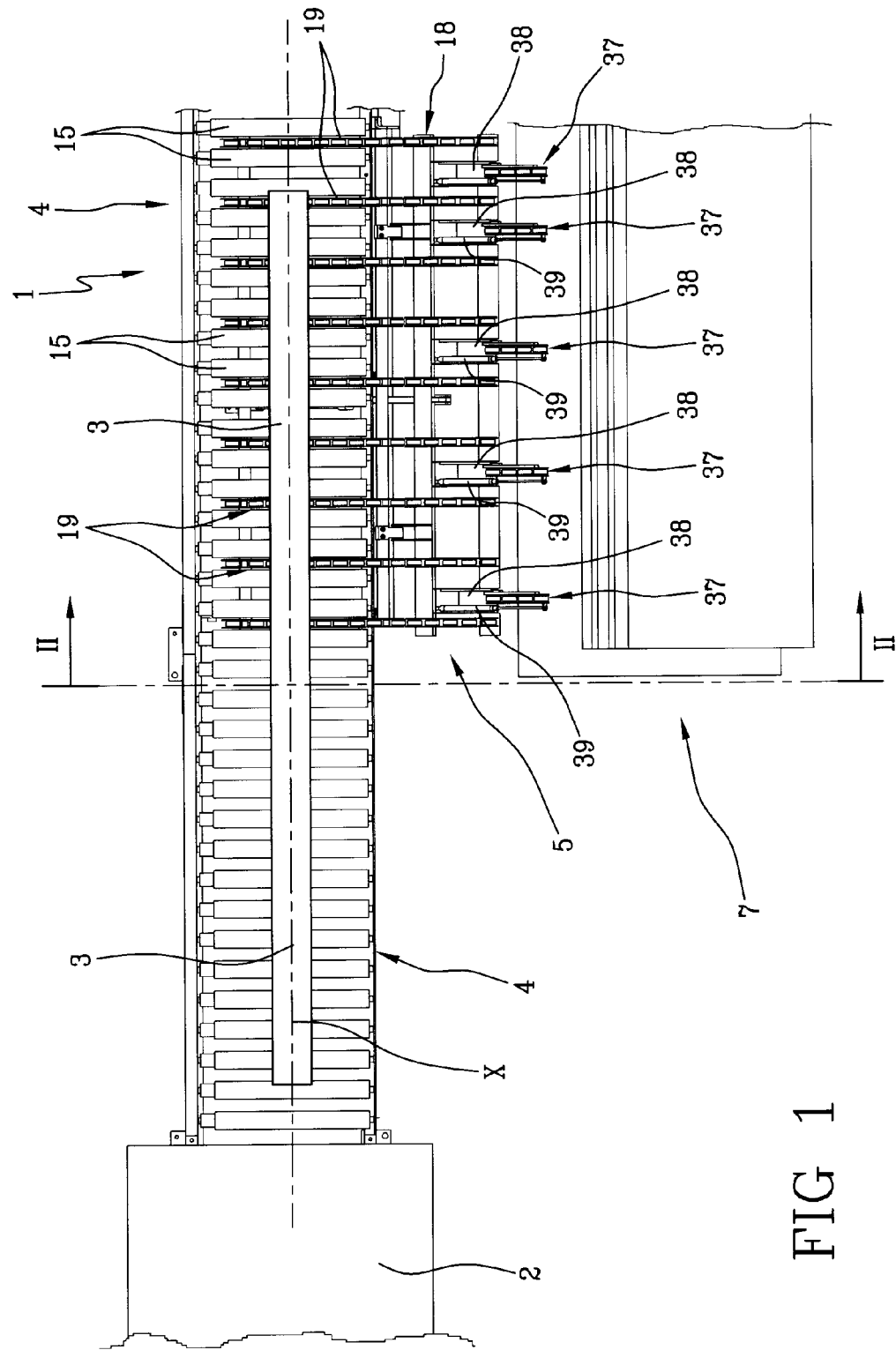
FIG. 1 shows a schematic view from above of a drawing line for drawing semifinished products for manufacturing tyres that is associated with a stocking apparatus according to the present invention.

With reference to the aforesaid figures, 1 generally indicates an apparatus for stocking semifinished products for manufacturing tyres for vehicle wheels.

DETAILED DESCRIPTION OF THE INVENTION

The apparatus 1 is operationally associated with a drawing line 2 (illustrated solely in a schematic manner in FIG. 1) of semifinished products 3 consisting of bands or belts in elastomeric material intended to form components, such as tread bands, sidewalls or bead-filling elements of tyres for motor vehicles. The apparatus 1 comprises a roller conveyor 4 which extends along a preset supplying direction "X" and is operationally connectable to the drawing line 2. The semifinished product 3, which is manufactured by the drawing line 2, is cut to size on the basis of the dimensions of the tyre to be manufactured and then subsequently supplied on the roller conveyor 4 as far as an unloading station 5. At the aforesaid unloading station 5, the semifinished products 3 supplied in succession are moved to the supporting planes 6 of a bench 7. Preferably, according to what is illustrated, the bench 7 is a book truck and comprises a plurality of trays each having a resting surface 6. The book truck 7 is further preferably arranged on a lifting platform 8 (visible in FIG. 2). The semifinished products 2 remain stocked in the book truck 7 until being arranged on the carcass of the tyre. Further, several unloading stations may be found along the roller conveyor 4.

More in detail, the roller conveyor 4 has a base 9 comprising vertical uprights 10 provided with feet 11 for resting on the ground, mutually connected by longitudinal crosspieces 12, parallel to the supplying direction "X", and by crossbars 13, that are perpendicular to the aforesaid supplying direction "X". Between two longitudinal crosspieces 12 mounted on upper ends 14 of the uprights 10 driven rollers 15 are installed. Each of the rollers 15 has opposite ends 15a, 15b that are rotatably engaged in the respective crosspieces 12 in such a way as to enable the roller to rotate around its own longitudinal axis "Z" that is arranged horizontally and is perpendicular to the supplying direction "X". At least one of the ends 15a, 15b is further mechanically connected to a motor that is not illustrated that is suitable for causing each roller 15 to rotate in a preset direction. In the illustrated embodiment (FIGS. 2, 3a, 3b, 3c, 4, 5a, 5b, 5c and 6), a pair of toothed wheels 16 are fitted on an end 15a of the roller 15 and each wheel 16 is engaged with a chain 17 connected to the motor.

In order to move the semifinished products, a lift 18 of the comb type is located near the unloading station 5 and comprises a plurality of arms 19 mounted on a supporting frame 20 hinged around a hinge axis "Y" parallel to the supplying direction "X" and located in a position below the rollers 15.

The lift 18 further comprises at least an actuator 21 operationally connected to the supporting frame 20 to determine the rotation thereof around the aforesaid hinge axis "Y".

Through this rotation, the lift 18 is moved between a loading position, in which the arms 19 lie at least partially interposed between the rollers 15 of the roller conveyor 4 (FIG. 2), and an unloading position, in which the arms 19 are rotated with respect to the loading position around the hinge axis "Y", and are at least partially raised with respect to the rollers 15 (FIG. 3a, 3b, 3c, 5a, 5b, 5c).

In the illustrated embodiment, an arm 19 is arranged every two rollers 15.

Figure 2:
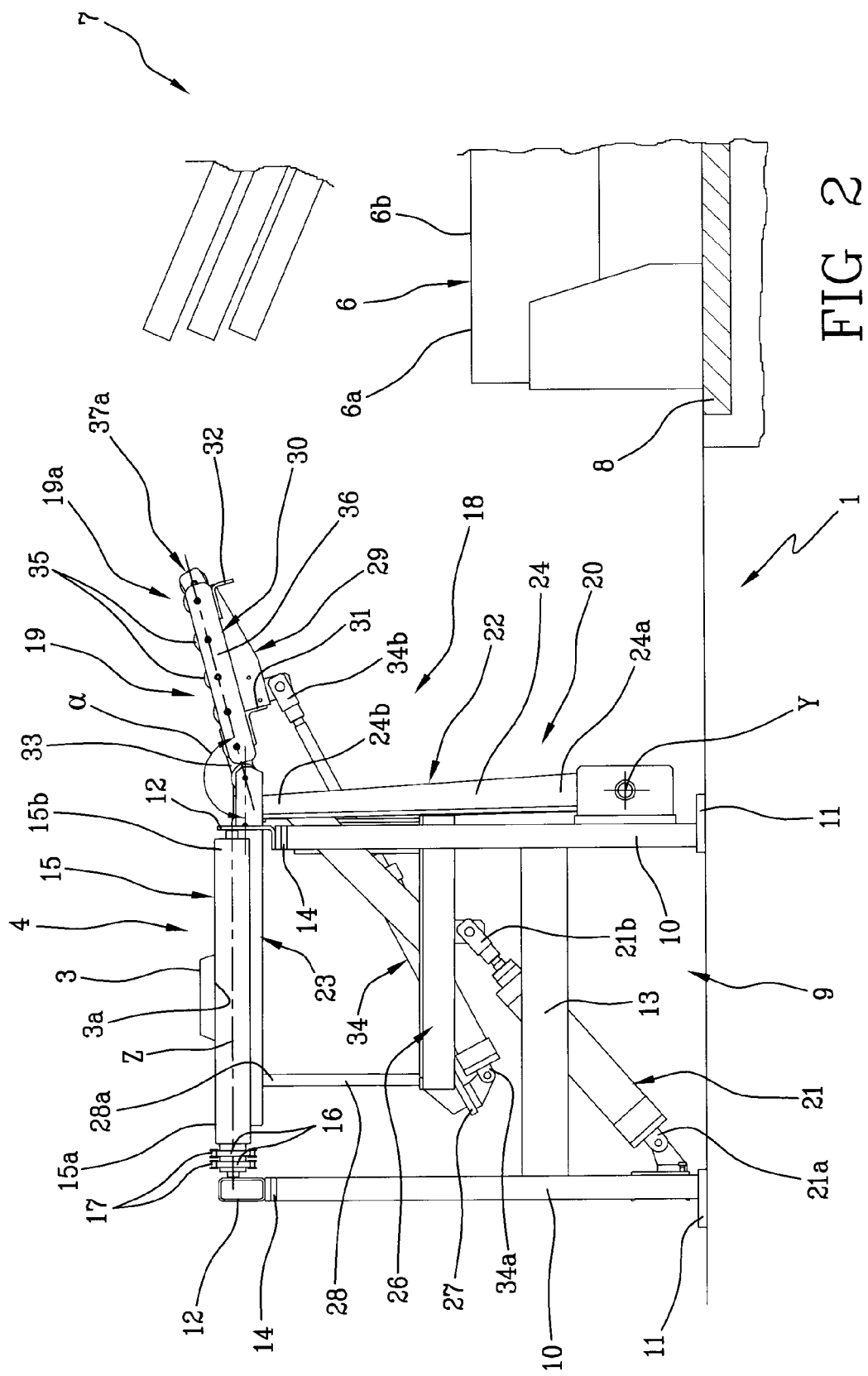
FIG. 2 shows a raised side view of the apparatus according to the invention according to section II-II of FIG. 1 in a first position and in a first operating configuration.

Whilst the arms 19 are in the loading position, semifinished product 3 is taken by the conveyor 4 as far as the unloading station 5 and is arranged above the arms 19 (FIG. 2).

Through rotation of the lift 18 the semifinished product 3 is lifted by the arms 19 which, in the unloading position, define a chute that is able to slide the semifinished product 3 by gravity along an unloading direction "W" that is perpendicular to the supplying direction "X" and to first ends 19a of these arms 19 located in a position above the resting plane 6 of the bench 7, in such a way as to drop the semifinished product 3 by gravity onto the resting plane 6.

Preferably, during sliding along the unloading direction "W", the semifinished product 3 assumes tilt angles with respect to a horizontal plane that grow progressively smaller, in such a way as to slow at the first ends 19a.

Figure 3A:
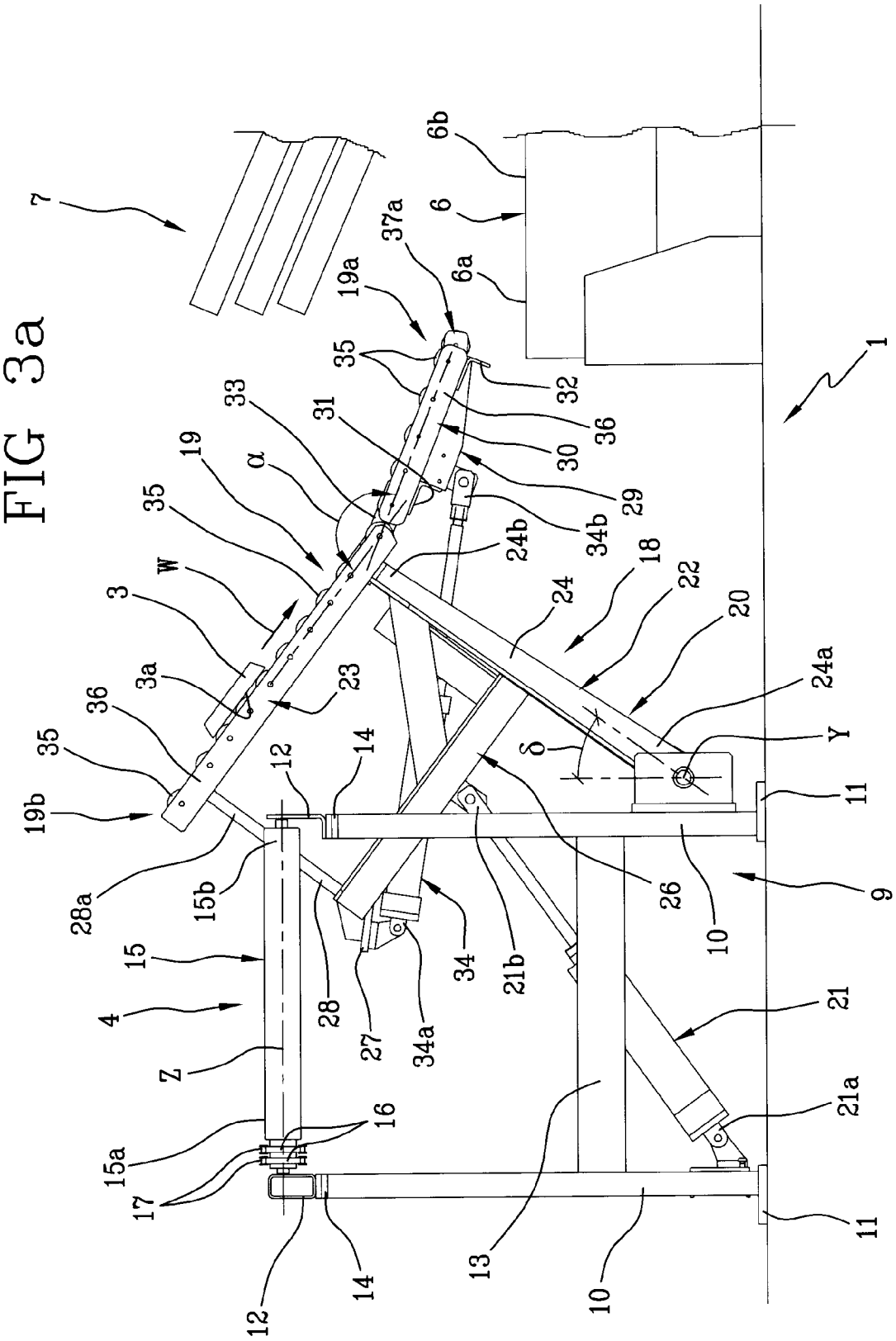
FIGS. 3a, 3b, 3c show the raised side view of FIG. 2 with the apparatus in the first operating configuration, in a second position and in respective operating instants.
Figure 3B:
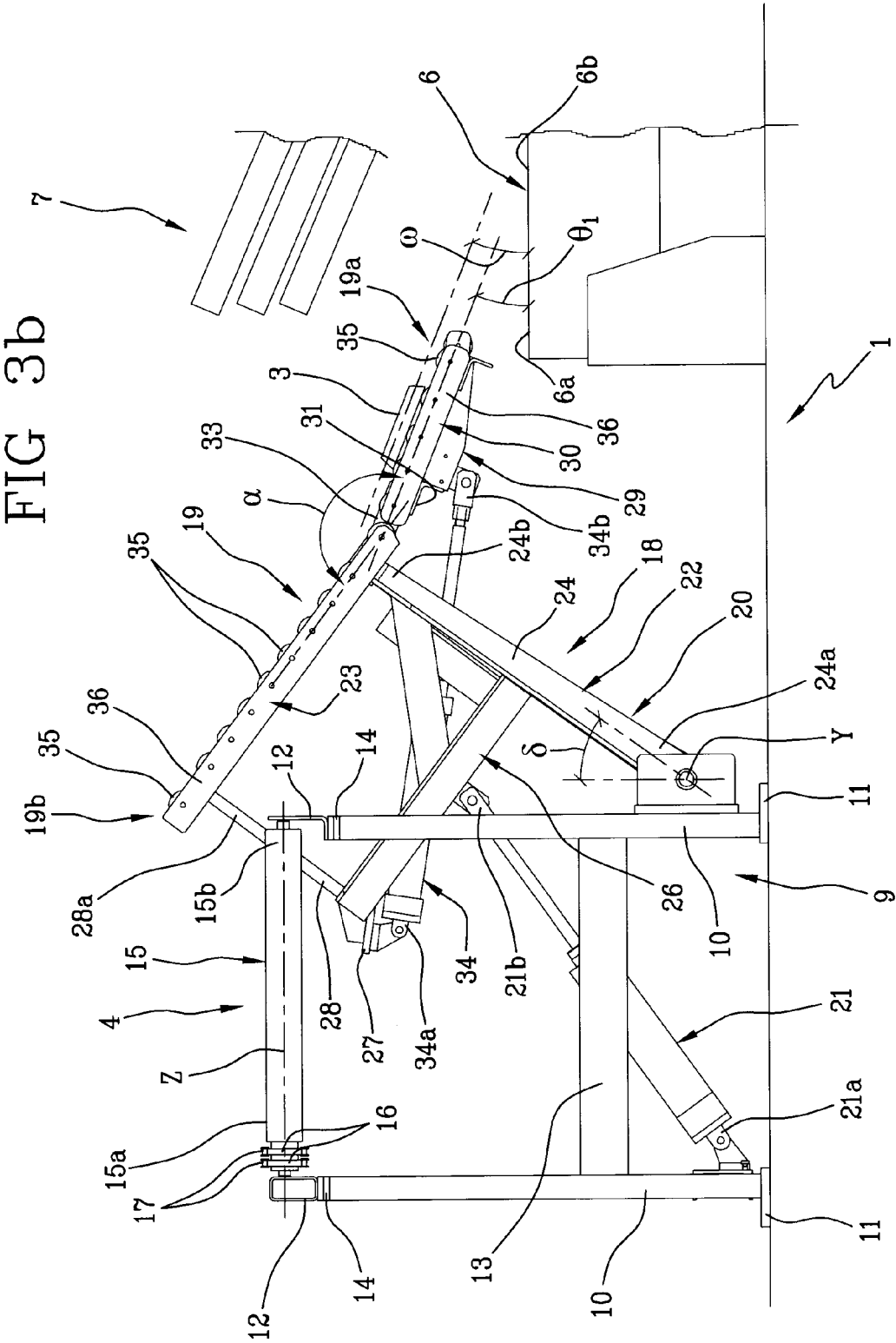
Figure 3C:
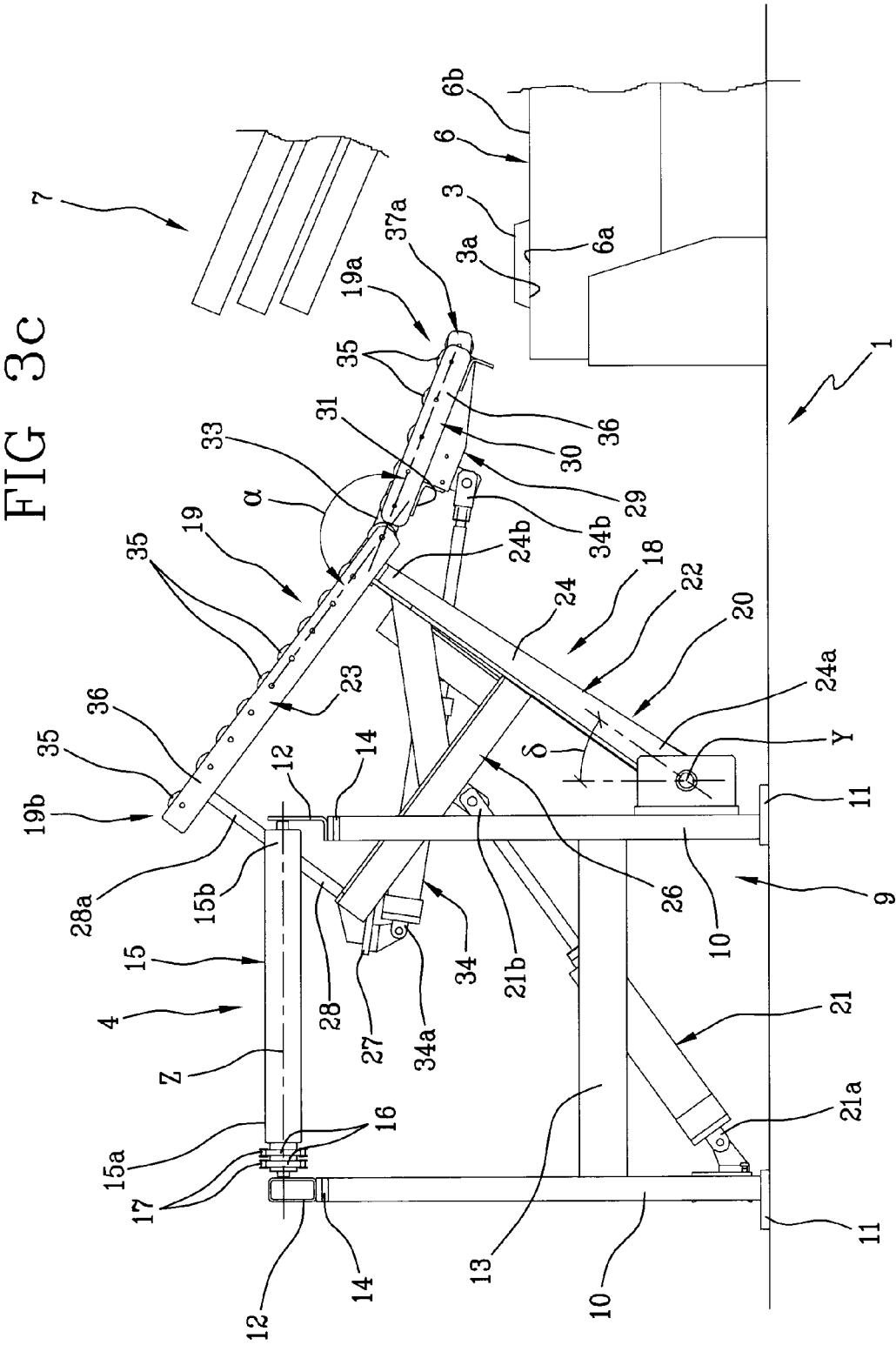

Further, when the semifinished product 3 passes onto the first ends 19a of the arms 19, or immediately before dropping, this semifinished product 3 forms with the resting plane 6 a tilt angle "ω" comprised between approximately 5° and approximately 20°, more preferably comprised between approximately 10° and approximately 15° (FIG. 3b).

More in detail, the supporting frame 20 has a first structure 22, which supports preferably rectilinear first portions 23, of the arms 19. In the loading position, the first portions 23 lie interposed between the rollers 15 of the conveyor 4.

The first structure 22 comprises uprights 24, each having a first end 24a rotatably engaged in the base 9 around the hinge axis "Y" of the lift 1B located near one of the feet 11 and a second end 24b jointed to a first longitudinal crosspiece 25 (FIG. 1a) parallel to the supplying direction "X".

A bar 26 extends perpendicularly from each of the uprights 24 and at an end thereof opposite the respective upright 24 has a second longitudinal crosspiece 27 parallel to the first 25. Supporting rods 28 substantially parallel to the uprights 24 extend from the second longitudinal crosspiece 27.

The first portion 23 of each of the arms 19 is supported by the first longitudinal crosspiece 25 and by an end 28a of one of the supporting rods 28.

The actuator 21 is preferably a cylinder of the pneumatic or hydraulic type having an end 21a rotatably connected to the base 9 at the foot 11 of the base 9 opposite the hinge axis "Y" and an opposite end 21b rotatably connected to the bar 26.

The supporting frame 20 has a second structure 29, which supports second portions 30 of the arms 19, which are also preferably rectilinear.

The second structure 29 has a first and a second longitudinal crosspiece 31, 32, which are mutually connected by the second portions 30. The first crosspiece 31 of the second structure 29 is further mounted by means of brackets 33 on the first longitudinal crosspiece 25 of the first structure 22. The brackets 33 are preferably hinged on the first longitudinal crosspiece 25 around axes "K" (FIGS. 1a and 6) parallel to the hinge axis "Y" of the lift 1B and can be locked in relation to the first longitudinal crosspiece 25, in such a way as to angle the second portions 30 of the arms 19 with respect to the first 23. In the loading position, the second portions 30 lie angled upwards with respect to the first 23 by an angle "α" that is less than 180° and extend in an overhanging manner from the roller conveyor 4.

For this purpose, an actuator 34 is mounted between the first structure 22 and the second structure 29 and is able to vary the mutual tilt of the aforesaid two structures 22, 29 and to lock the aforesaid two structures 22, 29 in the preset position.

Here and hereinafter in the present description "high" and "low" refer to the direction of the lines of gravity, as the operation of the apparatus according to the invention is based on the exploitation of the weight force.

Preferably, angle "α" delimited by the first portion 23 and by the second portion 30 of each arm 19 is comprised between approximately 130° and approximately 170° and more preferably comprised between approximately 140° and approximately 160°.

The actuator 34 is preferably a cylinder of the pneumatic or hydraulic type having an end 34a that is rotatably connected to the second longitudinal crosspiece 27 of the first structure 22 and an opposite end 34b rotatably connected to the first crosspiece 31 of the second structure 29.

Figure 6:
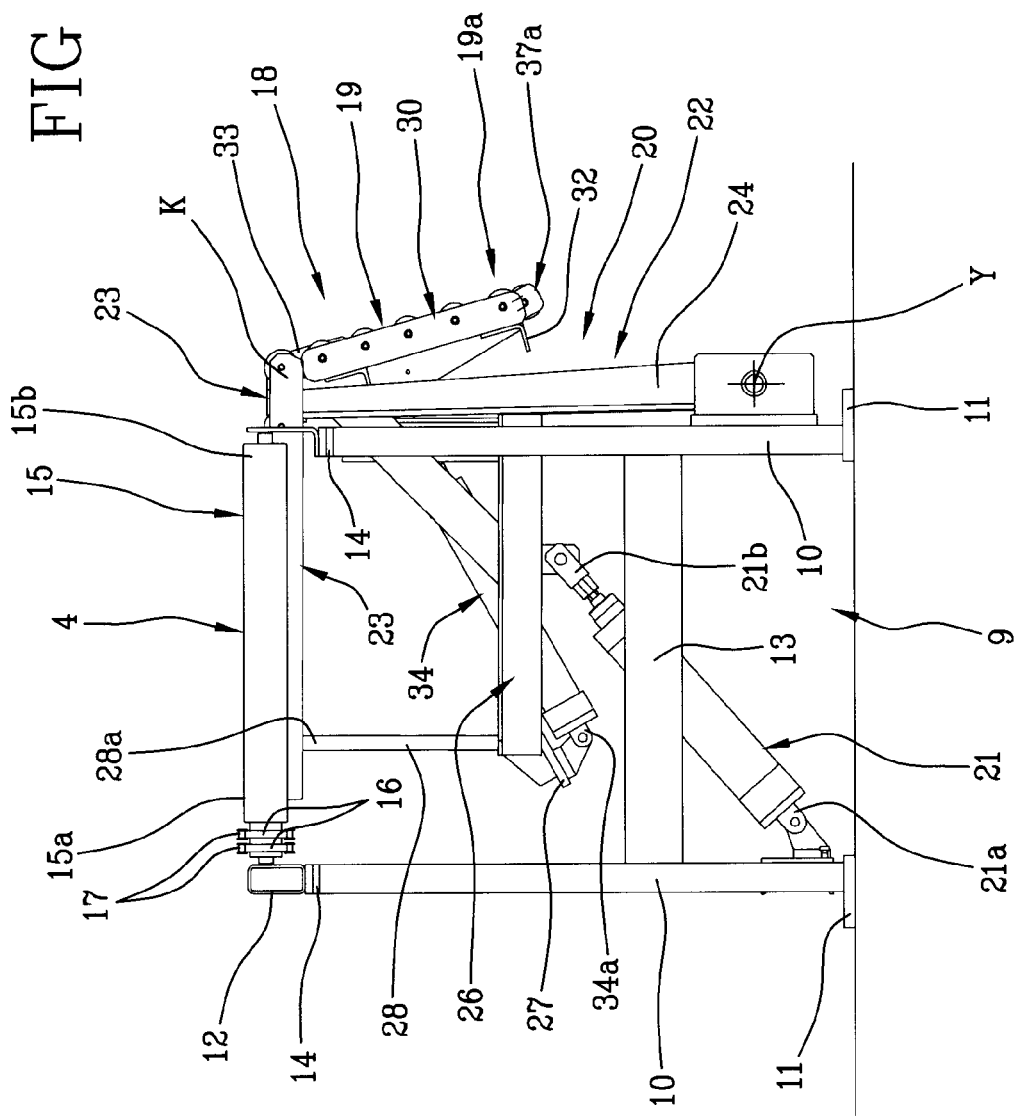
FIG. 6 shows the raised side view of FIG. 2 with the apparatus in a rest configuration.

Further, the actuator 34 enables the second structure 29 together with the second portions 30 of the arms 19 to be folded into a rest configuration, in which the second portions 30 lie folded downwards in a position that is transverse to the first portions 23 (FIG. 6). In this configuration, access to the conveyor 4 is made easy in such a way, for example, as to be able to perform maintenance work or to be able to unload the semifinished product 3 manually.

Each of the first 23 and of the second 30 portions of the arms 19 comprises a plurality of idling rollers 35 mounted between two plates 36 around rotation axes perpendicular to the unloading direction "W". The idling rollers 35 protrude beyond the plates 36 in such a way as to be able to support and slide the semifinished product 3 to be unloaded. Further, preferably, the rollers have a low inertia moment and are installed on bearings with low friction in such a way as to offer minimum resistance to rotation.

The lift 18 further comprises extensions 37 that are movable between a retracted position and an extracted position, in such a way as to extend the arms 19 of the lift to the bench 7 and drop successive semifinished products 3 by gravity onto different and adjacent zones 6a, 6b of the same resting plane 6.

In particular, the extensions are defined by auxiliary extension arms 37 mounted at the first ends 19a of the arms 19 and also having a plurality of idling rollers 35 mounted between two plates 36.

With reference to the attached figures, the auxiliary extension arms 37 are installed on the second structure 29 of the supporting frame 20 and are placed between second portions 30 of two adjacent arms 19.

In particular, guides 38 (FIGS. 1 and 1a) are mounted on the second structure 29 and an auxiliary arm 37 is movably slidable inside each guide 38 upon the command of a respective actuator 39 (FIG. 1), defined, for example, by a pneumatic or hydraulic cylinder mounted in the guide 38.

The auxiliary arms 37 are movable between a retracted position within the respective guides 38 and an extracted position in which the auxiliary arms 37 extend beyond the first ends 19a.

This solution, as detailed below, enables successive semifinished products 3 to be dropped by gravity onto different and adjacent zones 6a, 6b of the same resting plane 6.

In the extracted position, the auxiliary extension arms 37 delimit with the second portions 30 an angle "β" that is less than 180° (FIGS. 4 and 5a) and preferably comprised between approximately 130° and approximately 170° and more preferably comprised between approximately 140° and approximately 160°.

Figure 1A:
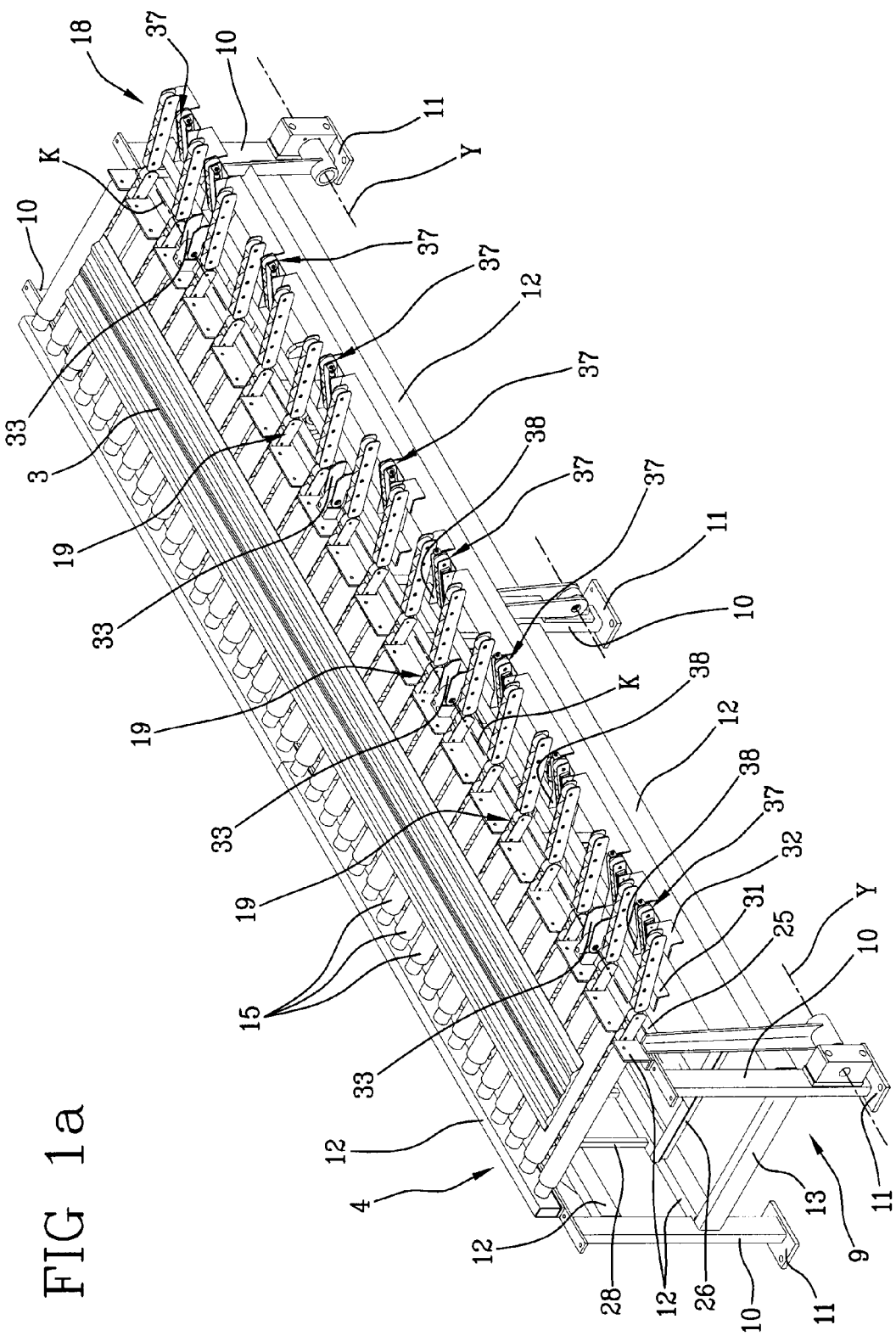
FIG. 1a shows a perspective view of the stocking apparatus in FIG. 1.

During the stocking process actuated by the apparatus 1, after drawing and cutting to size, the semifinished product 3 is conveyed to the unloading station 5, a surface 3a of the semifinished product 3 resting on the rollers 15 (FIGS. 1, 2).

When the semifinished product 3 reaches the aforesaid unloading station 5, the first portions 23 of the arms 19 of the lift 18 are located in a horizontal position between the rollers 15 and the idling rollers 35 lie flush with the rollers 15 in such a way so as not to damage the semifinished product 3 (FIG. 2).

The rollers 15 of the conveyor 4 are stopped and the lift 18 is rotated around the hinge axis "Y" to the bench 7 by an angle "δ" preferably comprised between approximately 30° and approximately 50°, more preferably comprised between approximately 40° and approximately 45°.

Alternatively, the arms 19 are lifted partially whilst the semifinished product 3 reaches the unloading station 5, in such a way as to slow the stroke of said semifinished product 3 along the supplying direction X without stopping the rollers 15.

Following rotation of the arms 19, second ends 19b of the arms 19 opposite the first ends 19a are raised in relation to the conveyor 4 and the first portions 23 of the arms 19 assume a position tilted towards the bench 7 by the rotation angle "δ" of the lift 18 (FIG. 3a). The semifinished product 3 starts to slide by gravity on the idling rollers 35 until reaching the second portions 30, where it slows through the decrease in the tilt of the arms 19 (FIG. 3b).

Preferably, in the unloading position, the second portions 30 define a sliding plane that is tilted with respect to the resting plane 6 by an angle "$\theta_1$" comprised between approximately 5° and approximately 20°, more preferably comprised between approximately 10° and approximately 15°, which angle "$\theta_1$" coincides substantially with the tilt angle "ω" formed by the semifinished product 3 with the resting plane 6.

At this point, as the auxiliary extension arms 37 are in the retracted position, the semifinished product 3 drops by gravity from the first end 19a onto a first zone 6a of the resting plane 6 of one of the trays of the bench 7 (FIG. 3c), which lies below and spaced apart from the first end 19a. In particular, the aforesaid first end 19a faces the first zone 6a.

The semifinished product 3 is deposited on the resting plane 6 with the same surface 3a that rested on the roller conveyor 4.

Figure 4:
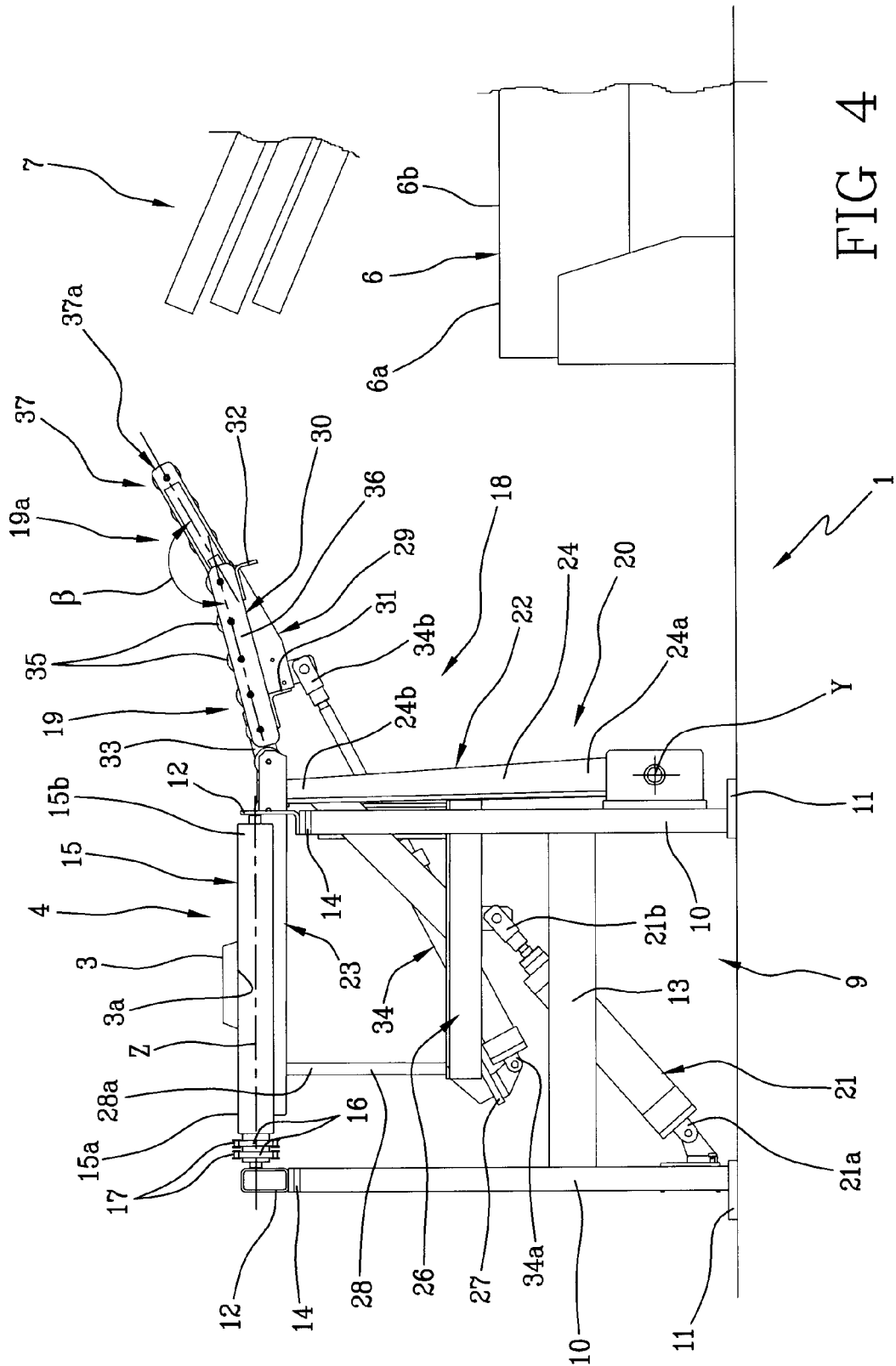
FIG. 4 shows the raised side view of FIG. 2 with the apparatus in the first position and in a second operating configuration.

Subsequently, the lift 18 is returned to the loading position, with the first portions 23 of the arms 19 located between the rollers 15, and the auxiliary arms 37 are taken to the extracted position (FIG. 4).

Figure 5A:
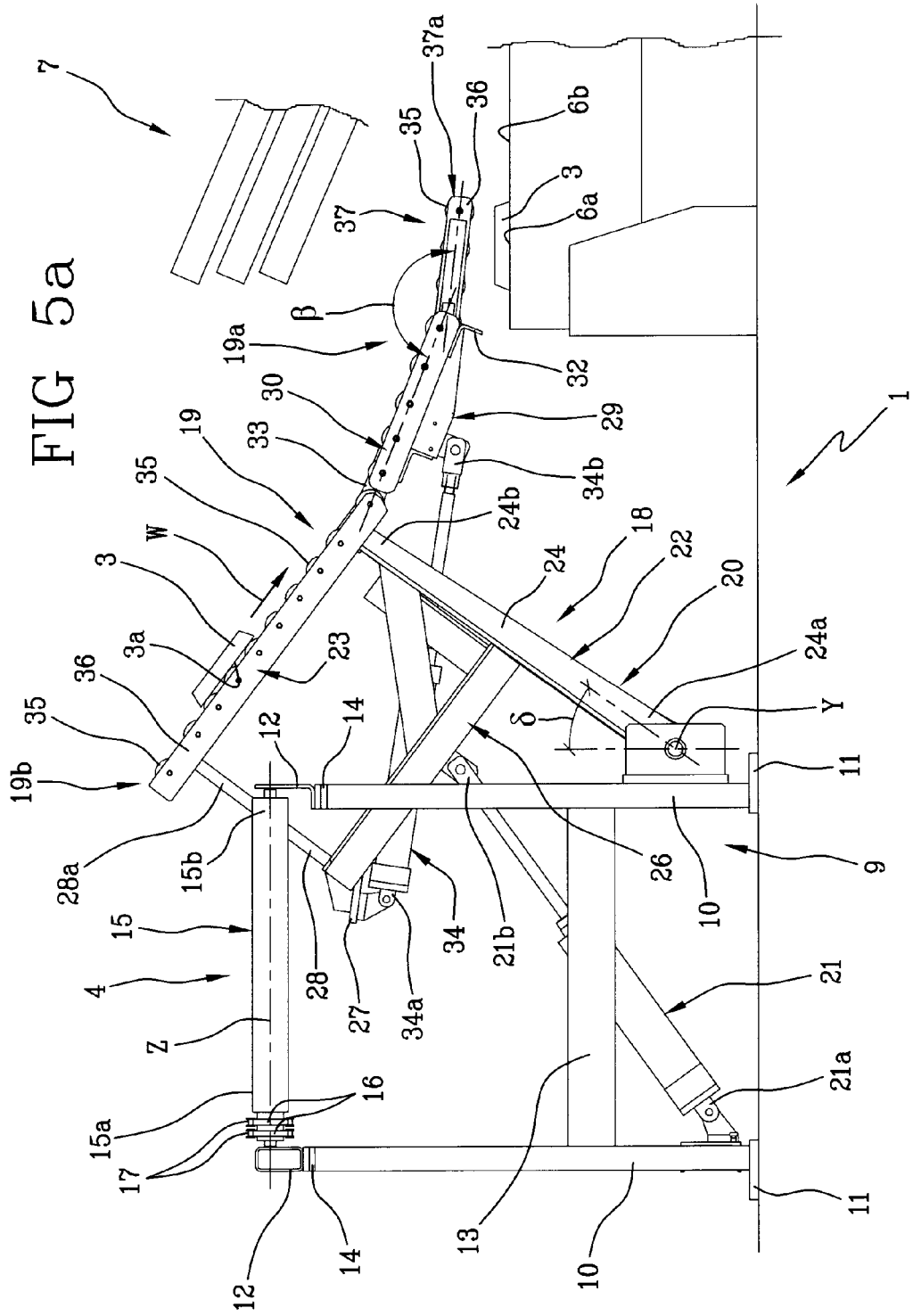

After a second semifinished product 3 has reached the unloading station 5, the lift 18 is again rotated by an angle "ν" that is the same as or different from the preceding rotation angle "δ" (FIG. 5a).

Figure 5B:
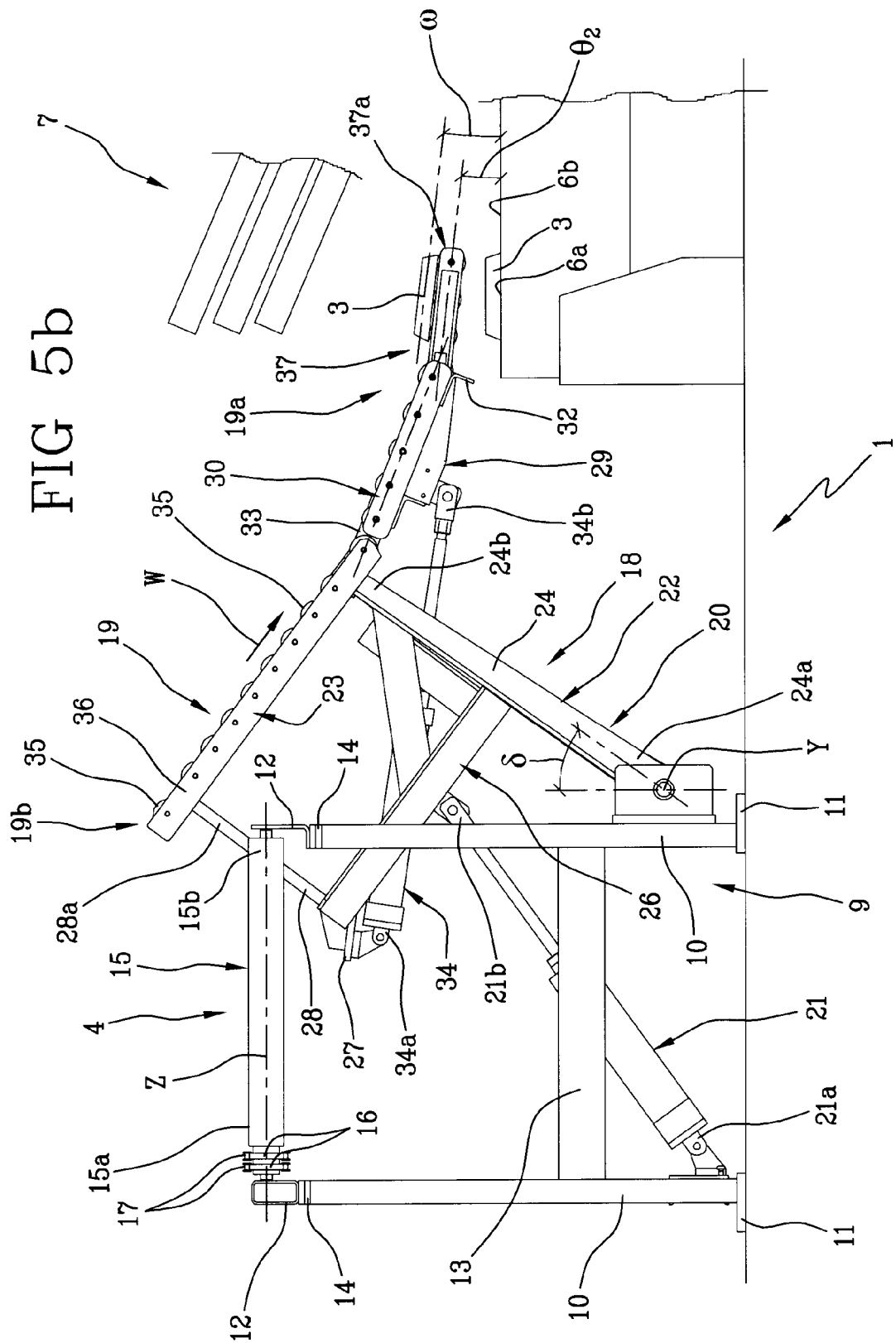

The semifinished product 3 starts to slide by gravity on the idling rollers 35, reaching as far as the auxiliary portions 37 placed in a higher position than a second zone 6b of the resting plane 6 and facing the second zone 6b, where this semifinished product 3 slows due to the decrease in the tilt of the arms 19 (FIG. 5b).

Preferably, in the unloading position the extracted auxiliary arms 37 define a sliding plane that is tilted with respect to the resting plane 6 by an angle "$\theta_2$" comprised between approximately 5° and approximately 20°, more preferably between approximately 10° and approximately 15°, which angle "$\theta_2$" coincides substantially with the tilt angle "ω" formed by the semifinished product 3 with the resting plane 6. This angle "$\theta_2$" is nevertheless less than the previously defined angle "$\theta_1$".

At this point, as the auxiliary extension arms 37 are in the extracted position, the semifinished product 3 passes beyond terminal ends 37a of the auxiliary arms 37 and drops by gravity onto the aforesaid second zone 6b adjacent to the first 6a (FIG. 4c).

Whilst the lift 18 is returned to the loading position, a new tray of the book truck 7 is lowered, ready to receive two further semifinished products 3, and the lifting platform 8 is lowered by a stroke that is substantially equal to the distance between two superimposed trays, in such a way as to maintain the position of the resting plane 6 constant.

The cycle disclosed above is repeated until all the trays of the bench 7 are filled.

The cycle can also be run in the opposite manner, i.e. by first depositing a first semifinished product 3 on the second zone 6b and subsequently depositing a second semifinished product 3 on the first zone 6a.

Further, the extraction of the auxiliary arms 37 can also be actuated during movement of the lift 18. The important thing is that these auxiliary arms 37 are in the correct position when a semifinished product 3 is about to be unloaded.

The invention claimed is:

1. An apparatus for stocking semifinished products for manufacturing tyres, comprising:
    a roller conveyor comprising a plurality of rollers defining a conveyance plane, the roller conveyor extending along a supplying direction and operationally connectable to a drawing line of a semifinished product to supply the semifinished product on said roller conveyor, said roller conveyor comprising at least an unloading station;
    a lift located near the unloading station and comprising a plurality of arms; and
    a bench positioned near the lift and comprising at least a resting plane,
    the lift being movable between a loading position, wherein the arms lie at least partially interposed between the rollers of the roller conveyor and beneath the conveyance plane, and an unloading position, wherein the arms are rotated with respect to the loading position around an axis parallel to the supplying direction and are at least partially raised,
    said arms in the unloading position having first ends placed above said at least a resting plane,
    said arms in the unloading position defining a chute for sliding the semifinished product by gravity along an unloading direction that is perpendicular to the supplying direction and to the first ends of said arms, in such a way as to drop the semifinished product by gravity onto the resting plane,
    wherein the bench is a book truck and comprises a plurality of trays, each of said trays having a resting plane.

2. The apparatus according to claim 1, wherein each of the arms comprises a plurality of idling rollers mounted on said arm around a rotation axis that is perpendicular to the unloading direction, in such a way as to enable sliding of the semifinished product on said idling rollers.

3. The apparatus according to claim 1, wherein each of the arms comprises a first portion that is interposable between the rollers of the roller conveyor and a second portion that is angled with respect to said first portion and having a respective first end; said second portion, in the loading position, being tilted upwards and protruding in an overhanging manner from the roller conveyor.

4. The apparatus according to claim 3, wherein the first portion and the second portion delimit an angle that is less than or equal to approximately 170°.

5. The apparatus according to claim 3, wherein the first portion and the second portion delimit an angle that is greater than or equal to approximately 130°.

6. The apparatus according to claim 3, wherein the first portion and the second portion delimit an angle that is less than or equal to approximately 160°.

7. The apparatus according to claim 3, wherein the first portion and the second portion delimit an angle that is greater than or equal to approximately 140°.

8. The apparatus according to claim 3, wherein second portions are foldable in a position that is transverse to first portions to facilitate access to the conveyor.

9. The apparatus according to claim 1, wherein the lift further comprises extensions that are movable between a retracted position and an extracted position comprising retracted auxiliary arms and extracted auxiliary arms, respectively, to drop successive semifinished products by gravity onto different and adjacent zones of the same resting plane.

10. The apparatus according to claim 9, wherein each of the extensions comprises a plurality of idling rollers mounted around a rotation axis that is perpendicular to the unloading direction.

11. The apparatus according to claim 3, wherein the lift further comprises auxiliary extension arms that are mounted at the first ends and are movable between a retracted position and an extracted position, wherein said auxiliary extension arms extend beyond the first ends, to drop successive semifinished products by gravity onto different and adjacent zones of the same resting plane.

12. The apparatus according to claim 11, wherein the auxiliary extension arms delimit, in the extracted position with the second portions, an angle that is less than or equal to approximately 170°.

13. The apparatus according to claim 11, wherein the auxiliary extension arms delimit, in the extracted position with the second portions, an angle that is greater than or equal to approximately 130°.

14. The apparatus according to claim 11, wherein the auxiliary extension arms delimit, in the extracted position with the second portions, an angle that is less than or equal to approximately 160°.

15. The apparatus according to claim 11, wherein the auxiliary extension arms delimit, in the extracted position with the second portions, an angle that is greater than or equal to approximately 140°.

16. The apparatus according to claim 3, wherein the lift comprises a supporting frame supporting the arms, the supporting frame being hinged around the axis parallel to the supplying direction.

17. The apparatus according to claim 16, wherein the lift comprises at least an actuator connected to the supporting frame to rotate said frame around the axis parallel to the supplying direction and move the lift between the loading position and the unloading position.

18. The apparatus according to claim 16, wherein the supporting frame comprises a first structure supporting the first portions of the arms and a second structure supporting the second portions of the arms.

19. The apparatus according to claim 18, wherein the second structure is hinged on the first structure and is movable with respect to said first structure between a work configuration, wherein the second portions are tilted upwards and protrude in an overhanging manner from the roller conveyor, and a rest configuration, wherein the second portions lie folded downwards in a position that is transverse to the first portions.

20. The apparatus according to claim 18, wherein the second structure further supports auxiliary extension arms mounted at the first ends and which are movable between a retracted position and an extracted position, wherein said auxiliary extension arms extend beyond the first ends to drop successive semifinished products by gravity onto different and adjacent zones of the same resting plane.

21. The apparatus according to claim 3, wherein, in the unloading position, the second portions define a sliding plane that is tilted with respect to the resting plane by an angle that is less than or equal to approximately 20°.

22. The apparatus according to claim 3, wherein, in the unloading position, the second portions define a sliding plane that is tilted with respect to the resting plane by an angle that is greater than or equal to approximately 5°.

23. The apparatus according to claim 3, wherein, in the unloading position, the second portions define a sliding plane that is tilted with respect to the resting plane by an angle that is less than or equal to approximately 15°.

24. The apparatus according to claim 3, wherein, in the unloading position, the second portions define a sliding plane that is tilted with respect to the resting plane by an angle that is greater than or equal to approximately 10°.

25. The apparatus according to claim 9, wherein, in the unloading position, the extracted auxiliary arms define a sliding plane that is tilted with respect to the resting plane by an angle that is less than or equal to approximately 20°.

26. The apparatus according to claim 9, wherein, in the unloading position, the extracted auxiliary arms define a sliding plane that is tilted with respect to the resting plane by an angle that is greater than or equal to approximately 5°.

27. The apparatus according to claim 9, wherein, in the unloading position, the extracted auxiliary arms define a sliding plane that is tilted with respect to the resting plane by an angle that is less than or equal to approximately 15°.

28. The apparatus according to claim 9, wherein, in the unloading position, the extracted auxiliary arms define a sliding plane that is tilted with respect to the resting plane by an angle that is greater than or equal to approximately 10°.

29. An apparatus for stocking semifinished products for manufacturing tyres, comprising:

a roller conveyor extending along a supplying direction and operationally connectable to a drawing line of a semifinished product to supply the semifinished product on said roller conveyor, said roller conveyor comprising at least an unloading station;

a lift located near the unloading station and comprising a plurality of arms; and a bench positioned near the lift and comprising at least a resting plane, the lift being movable between a loading position, wherein the arms lie at least partially interposed between the rollers of the roller conveyor and an unloading position, wherein the arms are rotated with respect to the loading position around an axis parallel to the supplying direction and are at least partially raised with respect to the rollers of the roller conveyor, said arms in the unloading position having first ends placed above said at least a resting plane, said arms in the unloading position defining a chute for sliding the semifinished product by gravity along an unloading direction that is perpendicular to the supplying direction and to the first ends of said arms, in such a way as to drop the semifinished product by gravity onto the resting plane, wherein the bench is a book truck and comprises a plurality of trays, each of said trays having a resting plane.

* * * * *